United States Patent [19]

Smith

[11] 4,003,873

[45] Jan. 18, 1977

[54] CEMENT-PHENOLIC RESIN COMPOSITIONS

[75] Inventor: Harry A. Smith, Midland, Mich.

[73] Assignee: The Dow Chemical Company, Midland, Mich.

[22] Filed: Nov. 16, 1972

[21] Appl. No.: 306,999

Related U.S. Application Data

[63] Continuation-in-part of Ser. No. 195,835, Nov. 4, 1971, abandoned.

[52] U.S. Cl. .................................. 260/38; 106/90; 260/39 R; 260/51.5
[51] Int. Cl.$^2$ ............................................. C08K 3/30
[58] Field of Search ............... 106/90; 260/29.3, 38, 260/51.5, 56, 39 R

[56] References Cited

UNITED STATES PATENTS

| | | | |
|---|---|---|---|
| 3,216,966 | 11/1965 | Collins | 106/90 X |
| 3,240,736 | 3/1966 | Beckwith | 260/29.2 |
| 3,471,443 | 10/1969 | Bornstein | 260/56 |
| 3,666,703 | 5/1972 | Murata et al. | 260/29.3 |

*Primary Examiner*—Donald E. Czaja
*Assistant Examiner*—S. M. Person
*Attorney, Agent, or Firm*—David H. Thurston; Glwynn R. Baker

[57] ABSTRACT

Mixtures of curable neutral and acid-catalyzed phenol-aldehyde resins and portland cement have been found to provide fast-curing, durable adhesive bonds for wood, masonry, and the like which for many applications are of improved strength as compared to those obtained with known bonding agents. Of particular interest are the compositions where the resin is an arylamine-modified phenol-formaldehyde resin.

3 Claims, No Drawings

CEMENT-PHENOLIC RESIN COMPOSITIONS

CROSS-REFERENCE TO RELATED APPLICATION

This is a continuation-in-part of copending application Ser. No. 195,835 filed Nov. 4, 1971 and now abandoned.

BACKGROUND OF THE INVENTION

The present invention relates to new and advantageous bonding compositions which are particularly useful for bonding wood and masonry. The invention also relates to the bonded articles thereby produced.

Phenol-aldehyde resins, particularly phenol-formaldehyde resins and many modifications of these have long been used as strong, water-resistant adhesives for making plywood and other bonded wood products. The curable intermediate stage resins useful in adhesive compositions of this class comprise two general types, those basically of novolac or bisphenol kind of structure but which have reactive alkylol groups on the aromatic rings, prepared by reacting phenol with an aldehyde in the presence of an acidic condensation catalyst, and resoles, particularly those having a preponderance of alkylol groups in ortho relationship to a phenolic hydroxyl, which are made by reacting phenol with aldehyde in the presence of a neutral or basic catalyst. Both types are curable to insoluble, infusible resins, usually by application of heat and, particularly in the case of those of alkylolated novolac structure, by reaction with additional aldehyde or other reactive cross-linking agent depending upon the structure of the resin. Acidic substances usually enhance the rate of cure.

Hydraulic cements such as portland cement have been combined with such curable resins, usually in either a very large or a very small proportion to obtain respectively a modified cement or a modified resin depending upon the proportion used. For example, Lefebure, British Pat. No. 231,242, Mar. 10, 1925, describes the addition of very small amounts of curable phenol-formaldehyde resin of the order of 0.5–10 percent to portland cement, along with water to set the cement, and heating the mixture to obtain a hard solid capable of being polished to a smooth surface. An example of the other kind of mixture known to the art in this area is disclosed by Thompson, U.S. Pat. No. 3,502,610. This patent describes the addition of 2–6 percent by weight of portland cement to resorcinol-formaldehyde resins to improve their molding properties and their resistance to water. Larger quantities of cement are said to produce mixtures which cure too fast and have poor physical properties.

Murata et al. in U.S. Pat. No. 3,666,703 describe a foundry core sand binder composition comprising a strongly alkaline aqueous phenol-formaldehyde resin, a relatively large proportion of a cement, and a substantial quantity of an alkaline accelerator. The particular type of intermediate resin shown is defined as unique for the purpose and other, more conventional types of phenol-formaldehyde intermediate resin are described as unsuitable for this use.

SUMMARY OF THE INVENTION

It has now been found that improved adhesive compositions having superior bonding properties for wood, masonry, and the like which are capable of fast curing at ambient temperature are obtained by mixing a curable phenol-aldehyde resin and about 20 to about 55 percent of portland cement based on the weight of resin. The curable resin has either a methylolated novolac structure or is a resole obtained by reacting formaldehyde with phenol or a mixture of phenol with up to 90 mole percent of a substituted phenol as defined below in appropriate proportions and in the presence of an acidic or a neutral condensation catalyst respectively. Particularly preferred compositions are made from such curable resins which have been further reacted with one or more aromatic amines.

DETAILED DESCRIPTION

The term portland cement is used herein with its usual meaning, that is, to define a family of hydraulic cements composed essentially of calcium silicates, calcium aluminate, and calcium aluminoferrate in various proportions with small amounts of sodium, potassium, magnesium, and sulfur compounds. About 20 to about 55 percent by weight of cement based on the weight of phenolic resin is used and about 40 to about 50 percent provides best results in most cases. No water is added to the resin-cement mixture except for the small amount which is present in the intermediate stage resin reaction product. Some additional water may be formed by reactions occurring between salts in the cement and hydroxyl groups in the resin as well as the water liberated by further condensation within the resin structure. The terms "weight of phenolic resin" or "weight of resin" as used above and in the claims in defining proportions refer to the weight of the reaction mixture obtained by reacting the aldehyde and the phenol in the presence of a small amount of catalyst and a minor amount of water. Such reaction mixtures are normally used as such and they typically contain about 90% by weight of resin solids.

Substantially any resole or alkylolated novolac type of curable resin produced by reacting phenol with up to about 2.2 mole equivalents of aldehyde in the presence of an acidic or essentially neutral catalyst can be used as the phenolic resin component. The term "essentially neutral catalyst" is used to define those catalysts whose water solutions have a pH of about 4–7, for example, divalent metal salts of weak organic acids. These catalysts are generally ortho-directing in their effect. Typical examples are calcium acetate, zinc benzoate, manganese acetate, and similar salts of magnesium, cadmium, and ferrous iron. Acidic catalysts include inorganic and organic acids conventionally used to make phenol-formaldehyde condensation products, for example, hydrochloric acid, sulfuric acid, phosphoric acid, and organic acids such as oxalic acid, p-toluenesulfonic acid, methanesulfonic acid and trichloroacetic acid. Phenol or a mixture of phenol with up to about 90 mole percent of a substituted phenol is useful as the phenol reactant in making the intermediate resin. Substituted phenols having at least two of the positions ortho and para to the phenolic hydroxyl group unsubstituted and capable of reaction with an aldehyde are suitable. Examples of these include lower alkyl substituted phenols such as p-tert-butylphenol and m-cresol, and polyhydric phenols such as resorcinol, hydroquinone, pyrocatechol, and bisphenols.

The aldehyde reactant is preferably formaldehyde, but other aldehydes such as acetaldehyde, propionaldehyde, furfuraldehyde, benzaldehyde, and mixtures of these are also operable. A preferred resole is obtained by reacting phenol with about 0.5–2.5 moles of formaldehyde in the presence of a neutral catalyst while a preferred methylolated novolac is obtained by reacting about 0.5–1.1 moles of phenol with formaldehyde in the presence of an acidic catalyst. Such modified novolacs have the characteristics of both resoles and novolacs, i.e., they have molecular structures containing substantial proportions of the reactive alkylol groups typical of resoles on the basic bisphenol structure of true novolacs.

Intermediate phenolic resins of particular interest are those prepared by reacting a resole or an alkylolated novolac as previously described with one or more of an aryl monoamine such as aniline, toluidine, or anisidine, or a difunctional arylamine such as m-hydroxyaniline or phenylenediamine. The intermediate resin can also be reacted with a combination of amines of both these classes. Where the intermediate resin is an alkylolated novolac, of course, it is assumed that there is a sufficient number of reactive alkylol groups in the modified novolac molecule to enable reaction with the aromatic amine. In one embodiment, these reactive groups can be incorporated as needed by an additional reaction step wherein aldehyde is condensed with a conventional novolac.

Aryl monoamines include aniline, ar-(lower alkyl) aniline, lower alkoxyaniline, and mixtures thereof where lower alkyl and lower alkoxy refer to radicals of 1–4 carbon atoms. Difunctional arylamines are defined as having the formula

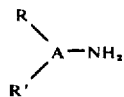

wherein A represents a benzene ring, a naphthalene nucleus, or a dicyclic moiety of the formula

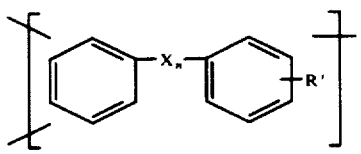

wherein X is oxygen, lower alkylidene, S, $SO_2$, or NH, n is zero or one, R is OH or $NH_2$, and R' is H, lower alkyl, or lower alkoxy. Preferred difunctional amines include m-hydroxyaniline, m-phenylenediamine, p,p'-oxydianiline, p,p'-methylenedianiline, and p,p'-diaminodiphenylamine. Other such amines which can be used are p,p'-sulfonyldianiline, p,p'-ethylidenedianiline, p,p'-thiodianiline, 4,4'-methylenebis (m-toluidine), 4,4'-butylidenebis(m-anisidine), benzidine, o-tolidine, 1,5-diaminonaphthalene, 1-amino-2-naphthol, and the like. A mixture of two or more such difunctional amines can also be used.

The arylamine-resin reaction can be carried out at any temperature between about 85° C. and the boiling point of the reaction mixture. The reaction is most conveniently run at about reflux temperature, usually for a reaction time of 0.5–5 hours.

Preferably, the intermediate resin is reacted with a combination of aniline or substituted aniline and a difunctional arylamine. Improved resin products are obtained when about 0.1–1.3 moles of aniline or substituted aniline are employed per mole of difunctional amine and the total amine reactants amount to about 0.05–0.5 g. mole per 100 grams of intermediate resin. Preferred proportions of amines are about 0.8–2 moles of monoamine per mole of difunctional amine and about 0.25–0.45 g. mole of total amines per 100 grams of intermediate resin.

Although the combined aryl monoamine and difunctional amine can be reacted with the resole in one step, preferably the amines are reacted separately, with the aniline or monosubstituted aniline-resole reaction carried out first and then the difunctional amine reacted with the product under generally similar conditions.

The portland cement acts in the present invention as a combination of resin-curing catalyst and reinforcing filler to make a final product which has advantages as an adhesive over both the resin and ordinary mortar when these are used alone. When used in combination with a thermosettable phenolic resin, for example, the cement produces a mixture which cures readily at room temperature and is a superior wood adhesive. Cement-resin mixtures of the invention are also superior mortars for bonding bricks, concrete blocks, ceramic foam, and the like. Stronger bonds with higher resistance to water are produced using less material than with conventional mortar.

Where the intermediate resin is a thermosettable resole prepared using an excess of aldehyde, portland cement can be used as the sole curing agent. In the case of a modified novolac or a resole made using a lower proportion of aldehyde, the resin is cured with a combination of cement and a formaldehyde source which can be paraformaldehyde, hexamethylenetetramine, or formaldehyde itself. A mixture of formaldehyde and a polyepoxide such as the diglycidyl ether of bisphenol A, an epoxidized novolac, or the diglycidyl ether of a polyglycol can be used in combination with cement or a polyepoxide alone can be used in combination with cement when the intermediate resin has been reacted with one or more arylamines as described above.

EXAMPLE 1

A resole resin of high ortho substitution was prepared by reacting phenol and aqueous formaldehyde in 1:2.2 molar proportions at reflux temperature in the presence of 1% by weight of calcium acetate as condensing catalyst. The resulting resole resin reaction mixture was mixed with different proportions of portland cement and the mixtures were tested as adhesives for concrete blocks by applying a layer of about 1/16 inch thick to the butt end of a block 6 × 8 inches × about 24 inches long, butting this block against another of the same size and allowing the adhesive to harden at room temperature, then determining the strength of the bonds by a flexural test. The bonded blocks were supported at both ends giving a total span of 30 inches with the bond in the center of the span. The blocks so supported were then progressively loaded with weight placed directly above the bond until failure occurred. Joints made with resin alone and with portland cement mortar alone were also tested.

| % Cement* | Gel Time, minutes | Cure Time, hours | Bond Strength p.s.i. | % Block Failure |
|---|---|---|---|---|
| 100 | — | 24 | 10 | 0 |
| 50 | 2 | 24 | 600 | 90 |
|  |  | 48 | >650 | 100 |

-continued

| % Cement* | Gel Time, minutes | Cure Time, hours | Bond Strength p.s.i. | % Block Failure |
|---|---|---|---|---|
| 37.5 | 60 | 90 | 450 | 0 |
| 0 | (requires thermal cure) | | — | — |

*based on total weight of mixture

EXAMPLE 2

The test procedure of Example 1 was repeated using the cement-resin compositions to bond a ceramic foam to itself and to a steel surface. The ceramic foam failed on flexing tests of the bonds in each case after curing for 15 hours at room temperature.

EXAMPLE 3

An amine-modified phenolic resin was prepared in 2 steps. An intermediate resin was made by refluxing for about 3 hours a mixture of phenol and paraformaldehyde, phenol/formaldehyde mole ratio = 1.3/1, about 10% water, and about 1% of calcium acetate monohydrate, both based on the weight of the reaction mixture. The intermediate resin thereby obtained was then mixed with 33.2 parts by weight of m-hydroxyaniline per 100 pts. of resin and the mixture was stirred at reflux temperature for 2 hours. A 36 g. sample of this product was mixed with 52 g. of portland cement and to the mixture was added a hardener consisting of 6 g. of an epoxidized phenol/formaldehyde novolac (reacted with epichlorohydrin), epoxide equivalent weight = 172–179, and 6 g. of 55% formaldehyde in aqueous methanol. The mixture gelled at room temperature in less than 30 seconds and it was hard in less than a minute. A concrete block butt bond made and tested as in Example 1 showed 80% block failure on breaking under flexure after standing for 18 hours.

The above procedure was repeated omitting the cement. Gel time of the resin-hardener mixture was 30–45 seconds and it was hard in 5–10 minutes. A concrete block butt bond made as described above showed 50% failure when broken in flexure after 24 hours.

EXAMPLE 4

The procedure of Example 3 was repeated using 32 g. of the same m-hydroxyaniline-modified resin, 52 g. of cement, and 16 g. of a hardener which was a 7:1 mixture of bisphenol A polyglycidyl ether (mol. wt. about 380) and 55% formaldehyde in aqueous methanol solution. Gel time of the mixture was 7 minutes at room temperture. A butt bond on concrete block broken in flexure after standing 5 hours showed 100% failure.

The same resin mixture without the cement had a gel time of 23 minutes.

EXAMPLE 5

Example 4 was repeated using a mixture of 10 g. of arylamine-modified phenol-formaldehyde curable resin, 5 g. of the same hardener mixture, and various proportions of portland cement. The phenol-formaldehyde resin was made by reacting phenol and paraformaldehyde in 1.28:1 mole ratio at reflux temperature in the presence of calcium acetate and a small amount of water, than refluxing that product with aniline and m-hydroxyaniline in a ratio of 0.153 g. mole of each arylamine to 100 grams of intermediate resin product. Butt bonds of the various resin-cement mixtures were made with glazed bricks, using the glazed surfaces to bond. The results are summarized in the table. Gel and cure times were determined at room temperature.

| % Cement (of total) | Gel Time, minutes | Cure Time, hours | % Brick Failure |
|---|---|---|---|
| 0 | 11–14 | 24 | 0 |
| 25 | 6 | 4–8 | 100 |
| 50 | 2 | 4–8 | 100 |

EXAMPLE 6

The procedure of Example 4 was repeated except for using the resin of Example 5. Flexural tests on bonded concrete showed results similar to those obtained with the glazed bricks.

EXAMPLE 7–9

Arylamine-modified resins were made as described in Example 5 using combinations of m-anisidine and m-hydroxyaniline, aniline and p,p'-methylenedianiline and aniline and p,p'-oxydianiline as the arylamine modifiers. Samples of these resins were mixed with 50 parts by weight of the 7:1 polyglycidyl ether-formaldehyde hardener of Example 4 per 100 pts. of resin and various proportions of portland cement. These mixtures were tested as wood adhesives using test pieces of Douglas fir 1 × 3 inches in size and one inch thick, coating one piece with excess resin, laying another test piece on the coated piece with the grain at right angles, and applying 2–3 lbs. per square inch pressure for 24 hours, surplus resin being squeezed out of the joint. The joint is then broken under tension according to cross-lap test method ASTM D-1344-57 and the bond strength recorded. The results are listed below in the Table.

| Example No. | Arylamine Modifier | Wt. % Cement | Gel Time Min. | Cross-Lap Test p.s.i. | % wood failure |
|---|---|---|---|---|---|
| 7 | m-anisidine m-hydroxy-aniline | 0 | 17 | 215–232 | 40–50 |
|  | " | 25 | 6 | 167–205 | 60 |
|  | " | 50 | 3 | 82–95 | 20–50 |
| 8 | aniline methylene-dianiline | 0 | 54 | 235–302 | 50 |
|  |  | 25 | 16 | 305–344 | 90–100 |
|  |  | 50 | 12 | 243–323 | 90 |
| 9 | aniline oxydianiline | 0 | 30 | 285–342 | 80 |
|  |  | 25 | 18 | 248–270 | 70–80 |

| Example No. | Arylamine Modifier | Wt. % Cement | Gel Time Min. | Cross-Lap Test p.s.i. | % wood failure |
|---|---|---|---|---|---|
| | | 50 | 12 | 13–123 | 0–30 |

EXAMPLE 10

A commercially available foundry sand core binder phenol-formaldehyde novolac made with a formaldehyde/phenol mole ratio of about 0.8/1 was mixed with 0.045 part by weight of glycerol-formaldehyde adduct (0.045:1 molar) and then cured at 150° C., with or without the presence of various curing agents. The cure time was measured by the stroke cure test wherein the time required to obtain a tack-free cured resin at 150° C. is measured using a thin film on a 150° C. hot plate. The emission of volatile materials was observed qualitatively by heating the cured resin at 150° C. and the relative brittleness of the cured resin was also observed.

| Catalyst | % Catalyst | Cure Time Min. | Volatile Emission | Strength of Resin |
|---|---|---|---|---|
| none | — | 100 | none | brittle |
| cement | 50 | 37 | none | moderately tough not brittle |
| 85% H$_3$PO$_4$ | 30 | 10 | severe | very brittle |
| p-toluene-sulfonic acid | 14 | 18 | severe | very brittle |

The comparative example below illustrates the difference and unsuitability for the present application of resoles made with a strongly basic catalyst. When a preferred proportion of cement is used, the combination reacts so fast that the mixture hardens and is set before mixing is complete so that it is not practical to use.

COMPARATIVE EXAMPLE

Samples of a conventional resole resin reaction mixture made by condensing one molar proportion of phenol with 1.8 parts of formaldehyde using 0.33 parts of NaOH as the catalyst were mixed with various amounts of portland cement and the room temperature gel times were determined.

| % Cement* | Gel Time | Remarks |
|---|---|---|
| 50 | <30 seconds | Reacts too fast to mix by hand |
| 33 | 1 minute | Reacts too fast to mix by hand |
| 9 | 20 minutes | Readily mixed and applied by hand |
| 0 | 3–4 months | Requires thermal cure |

*based on weight of mixture

I claim:

1. An adhesive composition comprising a curable phenol-aldehyde resin and from about 20 to about 55 percent based on the weight of the resin of portland cement wherein the phenol reactant used in making said resin is phenol or a mixture of phenol with up to about 90 mole percent of a substituted phenol having at least two of the positions ortho and para to the phenolic hydroxyl group unsubstituted and capable of reaction with an aldehyde and wherein the resin is a methylolated novolac or a resole obtained by reacting said phenol with formaldehyde in the presence of an acidic or an essentially neutral condensation catalyst and wherein the said phenol-formaldehyde resole or methylolated novolac is the product of reaction of about 0.05–0.5 gram mole per 100 grams of resole or novolac of at least one aromatic amine of the group consisting of aniline, ar-(lower alkyl)aniline, lower alkoxyaniline, and a difunctional aromatic amine of the formula

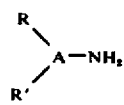

wherein A represents a benzene ring, a naphthalene nucleus, or a dicyclic moiety of the formula

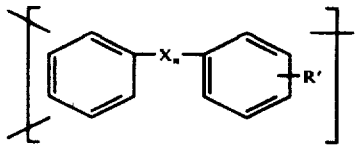

wherein X is oxygen, lower alkylidene, S, SO$_2$, or NH, $n$ is zero or one, R is OH or NH$_2$, and R' is H, lower alkyl, or lower alkoxy.

2. The composition of claim 1 wherein the phenol-formaldehyde resin is a resole and the aromatic amine is m-hydroxyaniline 3. The composition of claim 2 wherein the aromatic amine is a mixture of aniline and m-hydroxyaniline.

* * * * *

UNITED STATES PATENT AND TRADEMARK OFFICE
CERTIFICATE OF CORRECTION

PATENT NO. : 4,003,873
DATED : January 18, 1977
INVENTOR(S) : Harry A. Smith

It is certified that error appears in the above-identified patent and that said Letters Patent are hereby corrected as shown below:

Col. 4, line 49, delete "of".

Col. 4, line 51, after the word "block" insert -- up --.

Col. 5, line 23, after "10%" insert -- of --.

Col. 5, line 43, after "50%" insert -- block --.

Col. 6, line 1, delete "temperture" and insert -- temperature --.

Col. 6, line 2, after "100%" insert -- block --.

Col. 6, line 14, delete "than" and insert -- then --.

Col. 6, line 33, after "concrete" insert -- blocks --.

Col. 6, line 35, delete "EXAMPLE" and insert -- EXAMPLES --.

Col. 6, line 44, after "cement" delete "," and insert -- . --.

Col. 7, line 13, after "of" insert -- a --.

Signed and Sealed this

Seventeenth Day of May 1977

[SEAL]

Attest:

RUTH C. MASON
*Attesting Officer*

C. MARSHALL DANN
*Commissioner of Patents and Trademarks*